US012652700B2

(12) United States Patent
Silverman et al.

(10) Patent No.: US 12,652,700 B2
(45) Date of Patent: Jun. 9, 2026

(54) NARROWBAND BACKSCATTER DEVICE EXCITATION FOR MULTIPLE BACKSCATTER DEVICE SCHEDULING

(71) Applicant: Cisco Technology, Inc., San Jose, CA (US)

(72) Inventors: Matthew A. Silverman, Shaker Heights, OH (US); Sivadeep Reddy Kalavakuru, Akron, OH (US); Ardalan Alizadeh, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 232 days.

(21) Appl. No.: 18/458,735

(22) Filed: Aug. 30, 2023

(65) Prior Publication Data

US 2025/0081236 A1     Mar. 6, 2025

Related U.S. Application Data

(60) Provisional application No. 63/501,799, filed on May 12, 2023.

(51) Int. Cl.
H04W 74/0816     (2024.01)
H04W 74/08     (2009.01)

(52) U.S. Cl.
CPC ...  H04W 74/0816 (2013.01); H04W 74/0866 (2013.01)

(58) Field of Classification Search
CPC ...................... H04W 74/0816; H04W 74/0866
See application file for complete search history.

(56) References Cited

U.S. PATENT DOCUMENTS

| | | | |
|---|---|---|---|
| 5,940,006 A | 8/1999 | MacLellan et al. | |
| 2006/0223574 A1* | 10/2006 | Chandra | H04W 88/06 |
| | | | 455/552.1 |
| 2011/0127843 A1 | 6/2011 | Karaoguz | |
| 2020/0151532 A1 | 5/2020 | Sundaresan et al. | |
| 2020/0160133 A1 | 5/2020 | Zajic et al. | |
| 2020/0314752 A1 | 10/2020 | Haque et al. | |
| 2020/0374013 A1* | 11/2020 | Jang | H04R 17/00 |

(Continued)

FOREIGN PATENT DOCUMENTS

WO     2022222053 A1     10/2022

OTHER PUBLICATIONS

International Search Report and Written Opinion for International Application No. PCT/US2024/028739, mailed Sep. 3, 2024, 13 Pages.

*Primary Examiner* — Kevin M Cunningham
(74) *Attorney, Agent, or Firm* — Merchant & Gould P.C.

(57)     ABSTRACT

Backscatter Device (BKD) scheduling and, specifically, narrowband BKD excitation for multiple BKD scheduling may be provided. An AP may determine to transmit an excitation transmission to a plurality of BKDs. The AP may determine a trigger frequency for each of the plurality of BKDs, and the AP may transmit an excitation transmission comprising a plurality of excitation signals. Each excitation signal may have a frequency corresponding to one of the trigger frequencies for the plurality of BKDs. The plurality of excitation signals may be ordered for the plurality of BKDs to perform backscattering (i) concurrently; (ii) staggered in a single Transmit Opportunity; or (iii) a combination of (i) and (ii).

20 Claims, 9 Drawing Sheets

100

(56) References Cited

U.S. PATENT DOCUMENTS

| | | |
|---|---|---|
| 2021/0099198 A1 | 4/2021 | Reynolds et al. |
| 2021/0345038 A1 | 11/2021 | Ghaffarivardavagh et al. |
| 2021/0368439 A1 | 11/2021 | Karimaruthumkal et al. |
| 2022/0174676 A1* | 6/2022 | Huang ............... G06K 7/10069 |
| 2022/0248429 A1 | 8/2022 | Zhu et al. |

* cited by examiner

800

NARROWBAND BACKSCATTER DEVICE EXCITATION FOR MULTIPLE BACKSCATTER DEVICE SCHEDULING

RELATED APPLICATION

Under provisions of 35 U.S.C. § 119(e), Applicant claims the benefit of U.S. Provisional Application No. 63/501,799, filed May 12, 2023, which is incorporated herein by reference.

TECHNICAL FIELD

The present disclosure relates generally to providing Backscatter Device (BKD) scheduling and specifically to providing narrowband BKD excitation for multiple BKD scheduling.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
FIG. 1 is a block diagram of an operating environment for Backscatter Device (BKD) scheduling.
Figure 1:
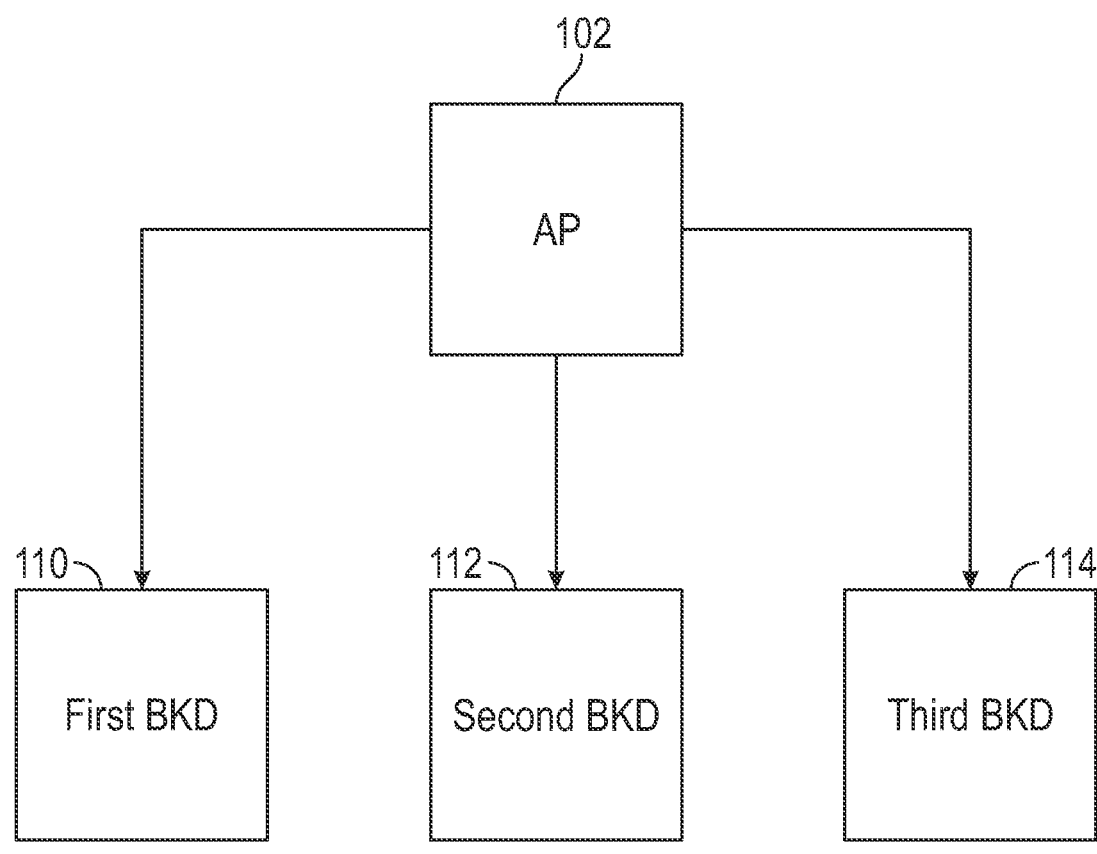

Backscatter Device (BKD) scheduling and, specifically, narrowband BKD excitation for multiple BKD scheduling may be provided. An AP may determine to transmit an excitation transmission to a plurality of BKDs. The AP may determine a trigger frequency for each of the plurality of BKDs, and the AP may transmit an excitation transmission comprising a plurality of excitation signals. Each excitation signal may have a frequency corresponding to one of the trigger frequencies for the plurality of BKDs. The plurality of excitation signals may be ordered for the plurality of BKDs to perform backscattering (i) concurrently; (ii) staggered in a single Transmit Opportunity; or (iii) a combination of (i) and (ii).

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Ambient Power (AMP) Backscatter Devices (BKDs) can use Radio Frequency (RF) signals to transmit data without a power source such as a battery or a connection to electricity. AMP BKDs can be Internet of Things (IoT) devices in some examples. The AMP BKDs may use an antenna to receive a RF signal, use the RF signal for excitation (e.g., convert the RF signal into electricity), and use the power to modify and reflect the RF signal with data. In some examples, the AMP BKDs modulate or otherwise modify the RF signal to include encoded data. Other devices can receive a reflected RF signal transmitted by an AMP BKD to determine the data the AMP BKD is sending. AMP BKD operations may be described in documents and standards from the Institute of Electrical and Electronics Engineers (IEEE). For example, the IEEE AMP topic interest group and the IEEE 802.11 standard may describe the operations of AMP BKDs.

Deterministic channel access may be an important capability for AMP BKDs that rely on wireless communication to transmit data in poor network environments. For example, AMP BKDs often operate in environments where the quality of communication channel is variable and there may be significant interference from other wireless devices. In such environments, deterministic channel access can enable the AMP BKDs to ensure that critical data is transmitted reliably and without delay, even in the presence of interference.

Additionally, if multiple BKDs are performing backscattering, such as Amplitude-Shift Keying (ASK), at the same time, the scale and performance of the BKDs may drop due to interference. Thus, avoiding collisions between multiple BKDs may increase BKD operation. If multiple BKDs are performing scattering (i.e., signal modulation and reflection), at the same time, the receivers (i.e., the devices that are receiving the signals from the BKDs) may be unable to decode the signals and/or only the strongest signal the receivers receive may be properly heard for decoding, drowning out the other BKD signals. For example, a first BKD's –70 Decibel Milliwatt (dBm) signal and a second BKD's –66 dBm signal may be drowned out by a third BKD's –50 dBm signal. Therefore, BKD excitation scheduling is described herein to alleviate the interference of BKDs.

FIG. 1 is a block diagram of an operating environment 100 for BKD scheduling. The operating environment 100 may include an Access Point (AP) 102, a first BKD 110, a second BKD 112, and a third BKD 114. The AP 102 may transmit excitation signals at specific frequencies for the first BKD 110, the second BKD 112, and/or the third BKD 114 to perform backscattering. The first BKD 110, the second BKD 112, the third BKD 114 may perform backscattering (e.g., ASK) in response to specific frequencies of transmissions, as will be described in more detail herein.

Figure 2:
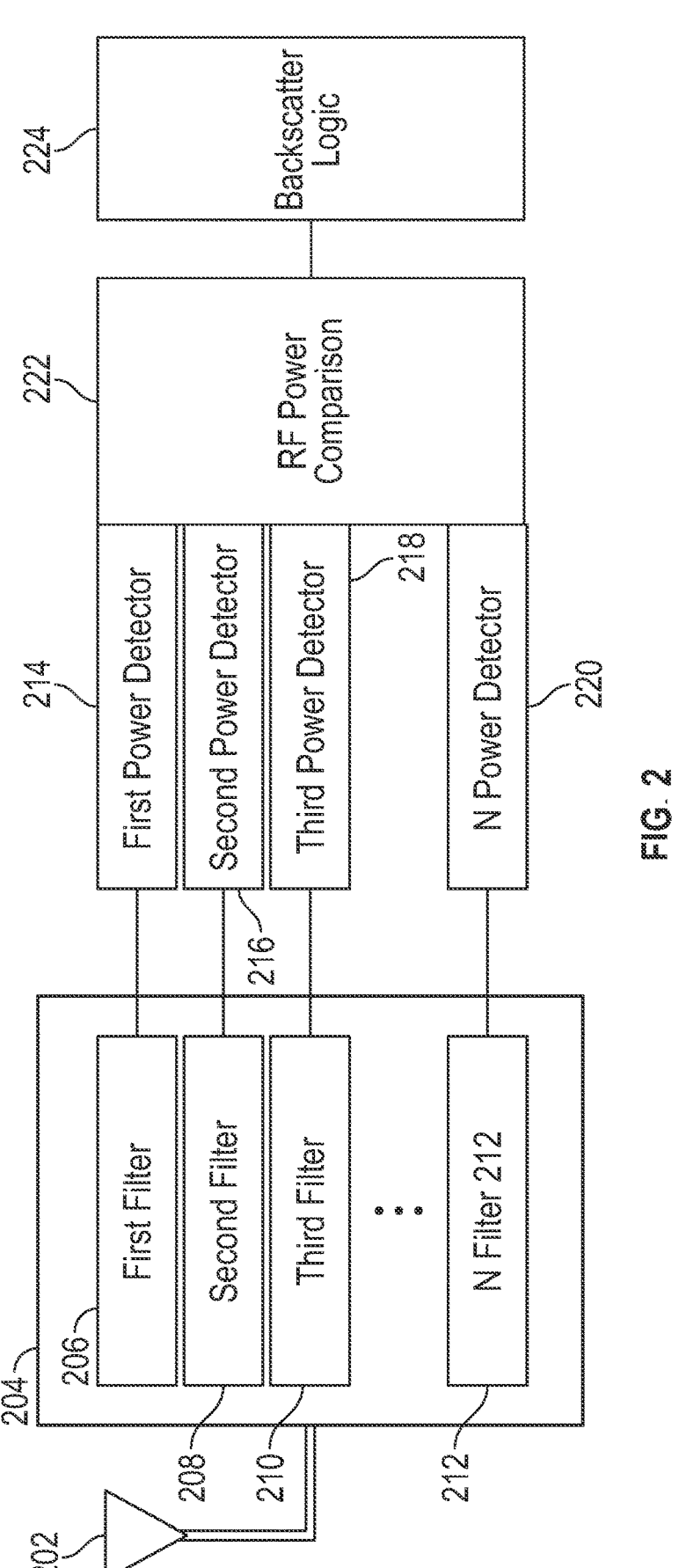
FIG. 2 is a block diagram of a BKD.

FIG. 2 is a block diagram of a BKD 200. The BKD 200 may be the first BKD 110, the second BKD 112, the third BKD 114. The BKD 200 may include an antenna 202, a filter bank 204, including a first filter 206, a second filter 208, a third filter 210, and an N filter 212, a first power detector 214, a second power detector 216, a third power detector 218, an N power detector 220, a Radio Frequency (RF) power comparator 222, and backscatter logic 224. The filter bank 204 may be connected to the antenna 202. The filter bank 204 may include any number of filters (e.g., one filter, multiple filters with discrete and standardized associated frequencies), as indicated by the N filter 212, with corresponding frequencies (e.g., the first filter 206 corresponding to 2,402 MHz, the second filter 208 corresponding to 2,412 MHz, the third filter 210 corresponding to 2,422 MHz, etc.) the filters will filter out. For example, the BKD 200 may have filters for ten frequencies across a 20 MHz range, every 2 MHz. The filters in the filter bank 204 may be bandpass filters, such as notch filters, which filter specific frequencies.

The first filter 206 may be connected to the first power detector 214, and the first power detector 214 may determine when the first filter 206 filters a signal at the first filter's 206 associated frequency based on power output by the first filter 206 when filtering a transmission. For example, the first filter 206 associated frequency may be 2,402 MHz. When the BKD 200 receives a 2,402 MHz transmission via the antenna 202, the first filter 206 may filter the frequency, and the first power detector 214 may determine the first filter 206 is filtering the frequency based on power output by the first filter 206. Similarly, the second filter 208 may be connected to the second power detector 216, so the second power detector 216 can determine when the second filter 208 filters a transmission. The third filter 210 may be connected to the third power detector 218, so the third power detector 218 can determine when the third filter 210 filters a transmission. And the N filter 212 may be connected to the N power detector 220, so the N power detector 220 can determine when the N filter 212 filters a transmission.

The BKD 200 (e.g., the first BKD 110, the second BKD 112, the third BKD 114) may perform backscattering via the backscatter logic 224 when the BKD 200 receives a transmission via the antenna 202 at a trigger frequency (i.e., a frequency the BKD 200 is assigned to perform backscattering) without other frequencies. The backscatter logic 224 may include any components (e.g., RF harvester, digital logic, decoder, controller, and/or the like) for performing backscattering. The frequency associated with the first filter 206, the second filter 208, the third filter 210, and/or the N filter 212 may be a trigger frequency. For example, the frequency associated with the first filter 206 may be a trigger frequency, the frequency associated with the second filter 208 may not be a trigger frequency, the frequency associated with the third filter 210 may be a trigger frequency, etc. There may be a general trigger frequency for the first BKD 110, the second BKD 112, the third BKD 114, and the first BKD 110, the second BKD 112, the third BKD 114 may all perform backscattering when the first BKD 110, the second BKD 112, the third BKD 114 receive an excitation transmission with the general trigger frequency.

In an example, the first filter 206 may be associated with 2,402 MHz, and the 2,402 MHz may be a trigger frequency for the BKD 200. When the BKD 200 receives a transmission via the antenna 202 with a frequency of 2,402 MHz, the first filter 206 may filter the transmission because of the transmission frequency, and the second filter 208, the third filter 210, and the N filter 212 may not filter the transmission. The first power detector 214 may detect that the first filter 206 is filtering the transmission, and the second power detector 216, the third power detector 218, and the N power detector 220 may determine that the other associated filters are not filtering the transmission. The RF power comparator 222 may detect that only the first power detector 214 detects filtering, indicating the frequency of the transmission (i.e., 2,402 MHz). The RF power comparator 222 and/or the backscatter logic 224 may then determine whether the identified frequency of the transmission is a trigger frequency. When the RF power comparator 222 and/or the backscatter logic 224 determine the identified frequency of the transmission is a trigger frequency, the backscatter logic 224 may perform backscattering using the transmission.

In some examples, the BKD 200 (e.g., the first BKD 110, the second BKD 112, and the third BKD 114) may have preestablished frequencies to perform backscattering (e.g., assigned during manufacturing). In other examples, the AP 102 and/or other devices such as a network controller will communicate with the BKD 200 to enable and/or disable frequencies to perform backscattering. In further examples, the trigger frequencies may be dynamic, changing over time to cycle through trigger frequencies. The change of trigger frequencies may be performed to avoid collisions with other BKDs. The change may occur in patterns predefined by a standard and/or network policy so the AP 102 knows which trigger frequencies are associated with which BKD (e.g., by identifying BKD trigger frequencies via pattern Identifiers (IDs) the BKDs transmit to the AP 102). Thus, the trigger frequencies of the BKD 200 may be static, modifiable to enable and/or disable frequencies to perform backscattering, and/or dynamically change.

The AP 102 may determine which BKDs the AP 102 can communicate with by sending a cycle transmission with different trigger frequencies. For example, the AP 102 may identify that the AP 102 can communicate with the first BKD 110, the second BKD 112, and the third BKD 114 after cycling through transmissions with trigger frequencies associated with the first BKD 110, the second BKD 112, and the third BKD 114. The AP 102 may also determine the trigger frequencies based on sending the cycle of transmissions with different frequencies, communicating with the BKDs, identifying the pattern IDs associated with the BKDs, and/or the like. The AP 102 may then schedule excitation transmissions for the BKDs with trigger frequencies to avoid collisions between the BKDs.

The AP 102 may enable multiple BKDs to perform backscattering at the same time without collisions using channel access methods for multiple clients such as Frequency Division Multiple Access (FDMA) and Time Division Multiple Access (TDMA). For example, the first BKD 110 and the second BKD 112 may have trigger frequencies that allow the first BKD 110 and the second BKD 112 to avoid collisions (e.g., frequencies without overlapping harmonics resulting from backscattering). Thus, the AP 102 can perform the channel access methods to enable the first BKD 110 and the second BKD 112 to perform backscattering at those trigger frequencies concurrently. The AP 102 may schedule FDMA and TDMA access for the first BKD 110, the second BKD 112, and/or the third BKD 114 to perform backscattering during a single Transmit Opportunity (TxOp). In some examples, the AP 102 may change the trigger frequencies of the first BKD 110, the second BKD 112, and/or the third BKD 114 to enable staggered and/or concurrent backscattering without collisions (e.g., changing the trigger frequencies to combinations of trigger frequencies that do not have overlapping harmonics resulting from backscattering). Additionally, the first BKD 110, the second BKD 112, and the third BKD 114 may have multiple trigger frequencies, so the AP 102 may select a combination of trigger frequencies from the available trigger frequencies to enable concurrent backscattering without collisions.

Figure 3:
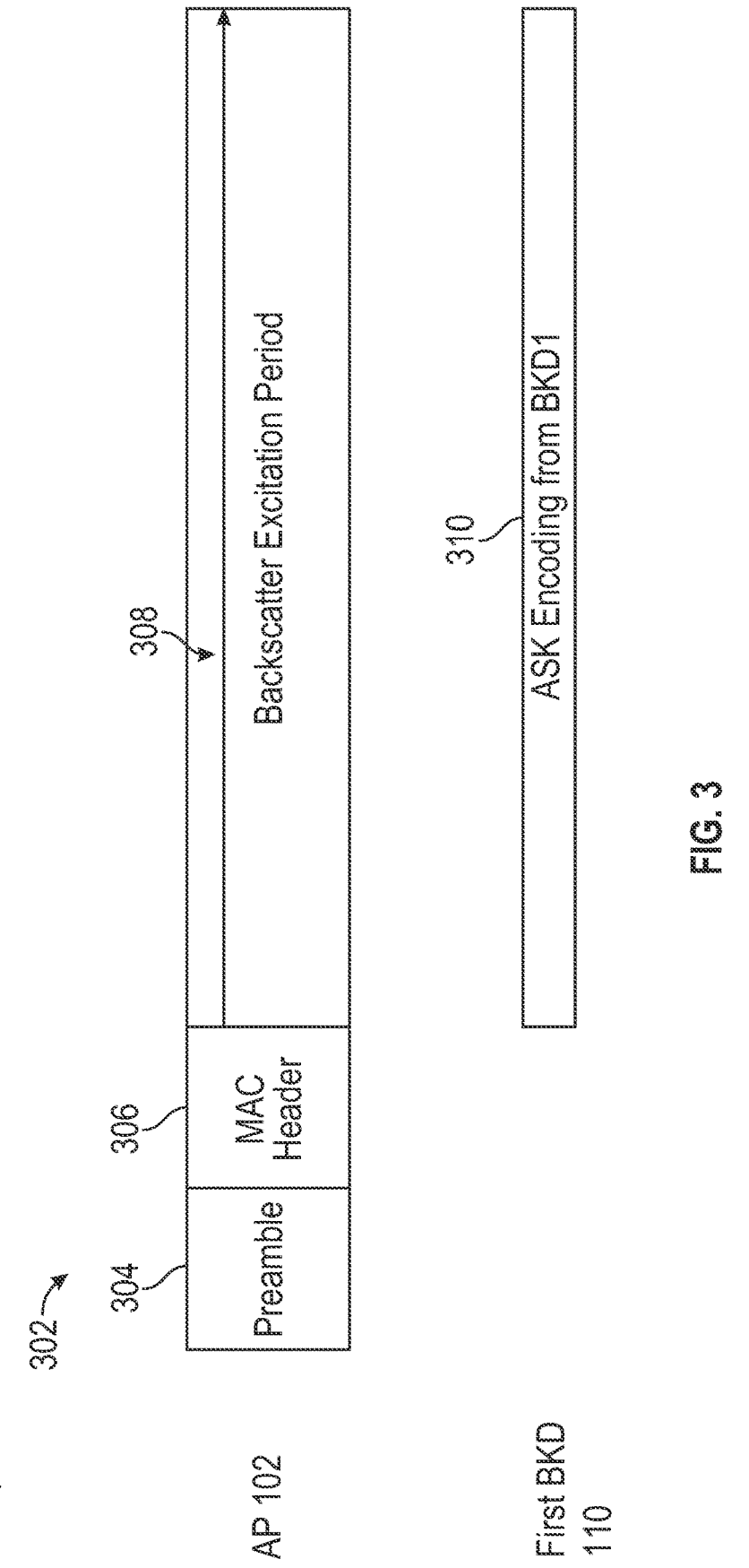
FIG. 3 is a block diagram of a first traffic scheduling signal process.

FIG. 3 is a block diagram of a first traffic scheduling signal process 300. The first traffic scheduling signal process 300 may performed for a single BKD to perform backscattering with no concurrent backscattering. The first traffic scheduling signal process 300 may include the AP 102 and the first BKD 110. In the first traffic scheduling signal process 300, the AP 102 may transmit a first excitation transmission 302. The first excitation transmission 302 may include a preamble 304, a header 306, and a first trigger frequency excitation signal 308. The preamble 304 may be a legacy preamble as described by the IEEE 802.11 standard and may include one or more fields, such as a Legacy Short Training Field (L-STF), a Legacy Long Training Field (L-LTF), and a Legacy Signal Field (L-SIG). When a BKD receives a L-STF, the BKD may determine to begin packet detection, perform automatic gain control, perform frequency offset estimation, perform initial time synchronization, and/or the like. When an BKD receives a L-LTF, the BKD may perform channel estimation, perform a more accurate frequency offset estimation compared to the estimation performed when the S-LTF is received, perform more accurate time synchronization compared to the estimation performed when the S-LTF is received, and/or the like. When an BKD receives a L-SIG, the BKD may determine packet information for the received configuration such as data rate, data length, transmission time, and/or the like. The header 306 may be a Media Access Control (MAC) header and may include destination and source MAC addresses.

The first trigger frequency excitation signal 308 may have a frequency that is a trigger frequency of the first BKD 110. Thus, when the first BKD 110 receives the first excitation transmission 302, one of the filters in the first BKD 110 filter bank 204 (e.g., the first filter 206, the second filter 208, the third filter 210, or the N filter 212) may filter the first trigger frequency excitation signal 308, and the associated power detector (e.g., the first power detector 214, the second power detector 216, the third power detector 218, or the N power detector 220) may determine the filter is filtering the first trigger frequency excitation signal 308. The RF power comparator 222 may then identify that the filter is filtering the first trigger frequency excitation signal 308 via the power detectors, the RF power comparator 222 and/or the backscatter logic 224 may determine the first trigger frequency excitation signal 308 has a frequency that is a trigger frequency of the first BKD 110, and the backscatter logic 224 may perform first BKD backscattering 310. Other BKDs, such as the second BKD 112 and the third BKD 114, may not have the frequency of the first trigger frequency excitation signal 308 and therefore may not perform backscattering.

Figure 4:
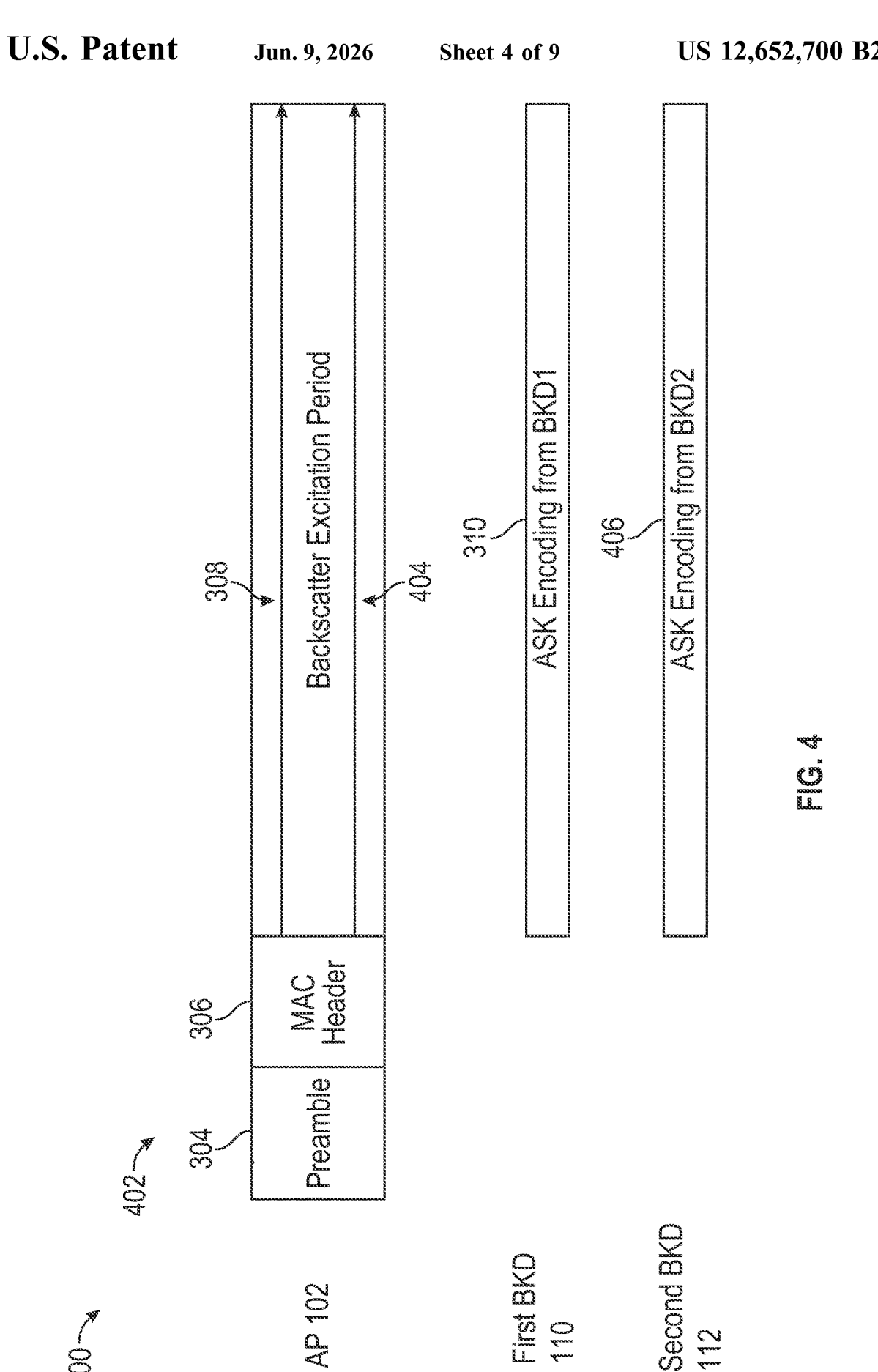
FIG. 4 is a block diagram of a second traffic scheduling signal process.

FIG. 4 is a block diagram of a second traffic scheduling signal process 400. The second traffic scheduling signal process 400 may be performed for concurrent backscattering of two BKDs. The second traffic scheduling signal process 400 may include the AP 102, the first BKD 110, and the second BKD 112.

The AP 102 may transmit a second excitation transmission 402. The second excitation transmission 402 may include the preamble 304, the header 306, the first trigger frequency excitation signal 308, and a second trigger frequency excitation signal 404. The first trigger frequency excitation signal 308 may have a frequency of a trigger frequency of the first BKD 110, and the second trigger frequency excitation signal 404 may have a frequency of a trigger frequency of the second BKD 112. Thus, the first BKD 110, in response to receiving the first trigger frequency excitation signal 308, may perform first BKD backscattering 310 concurrently with the second BKD 112 performing second BKD backscattering 406 in response to the second trigger frequency excitation signal 404. The AP 102 may determine trigger frequencies without overlapping harmonics resulting from backscattering and/or use FDMA and/or TDMA to prevent collisions between the first BKD 110 and the second BKD 112 during the concurrent first BKD backscattering 310 and second BKD backscattering 406.

Figure 5:
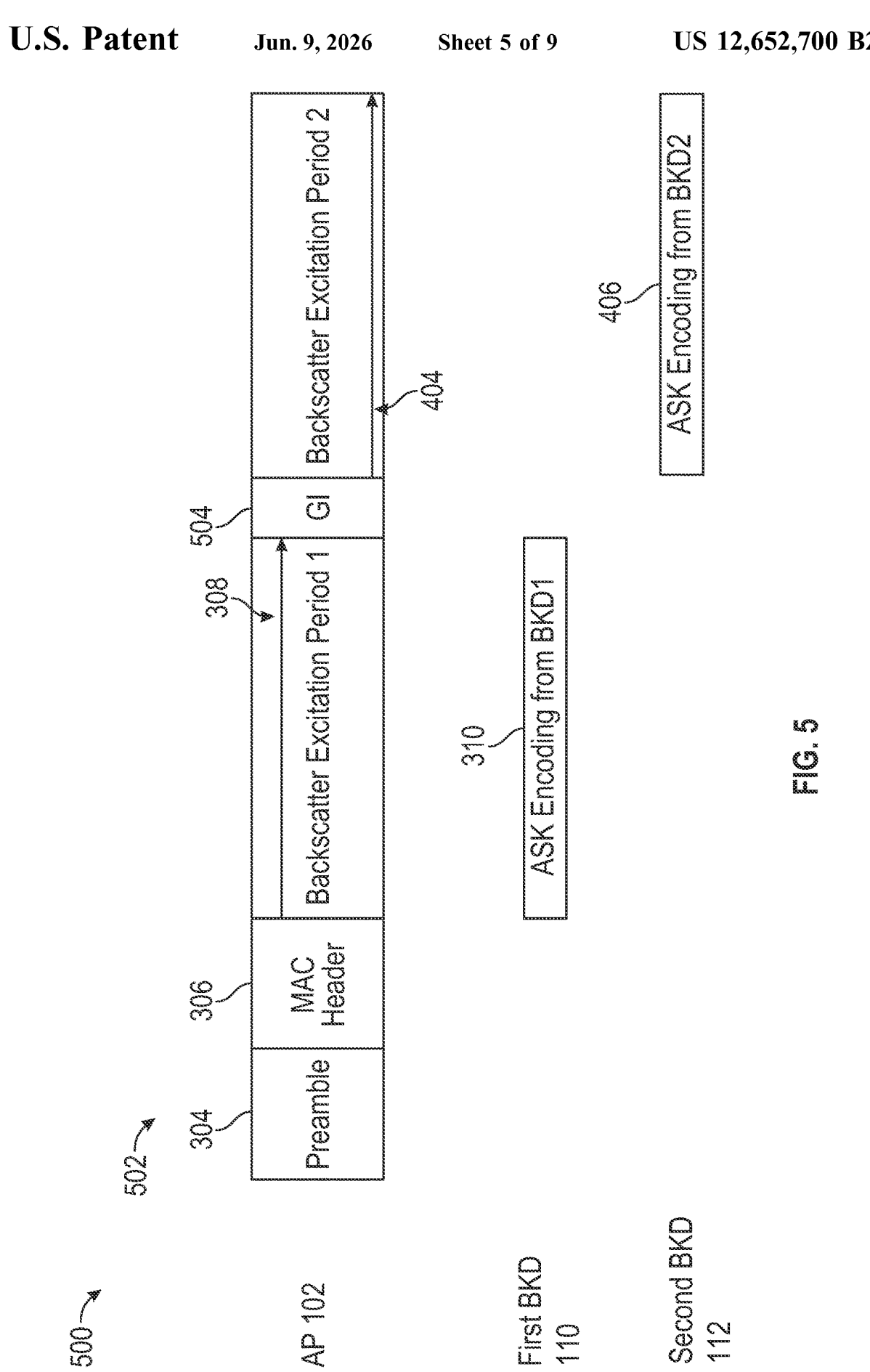
FIG. 5 is a block diagram of a third traffic scheduling signal process.

FIG. 5 is a block diagram of a third traffic scheduling signal process 500. The third traffic scheduling signal process 500 may be performed for staggered multi-BKD backscattering during a single TxOp without concurrent backscattering. The AP 102 may perform the third traffic scheduling signal process 500 when there is not a combination of trigger frequencies and/or FDMA and/or TDMA cannot be performed for concurrent backscattering. The third traffic scheduling signal process 500 may include the AP 102, the first BKD 110, and the second BKD 112.

The AP 102 may transmit a third excitation transmission 502, and the third excitation transmission 502 may include the preamble 304, the header 306, the first trigger frequency excitation signal 308, the second trigger frequency excitation signal 404, and a Guard Interval (GI) 504. The AP 102 may transmit the first trigger frequency excitation signal 308 first, enabling the first BKD 110 to perform first BKD backscattering 310. The AP 102 may then cease transmitting the first trigger frequency excitation signal 308 and delay transmitting the second trigger frequency excitation signal 404 for the GI 504. The AP 102 may delay for the GI 504 to ensure the first BKD backscattering 310 and the second BKD backscattering 312 do not interfere with one another. After the GI 504, the AP 102 may transmit the second trigger frequency excitation signal 404, enabling the second BKD 112 to perform second BKD backscattering 406. Thus, the first BKD 110 and the second BKD 112 may perform backscattering during a single TxOp at staggered times.

Figure 6:
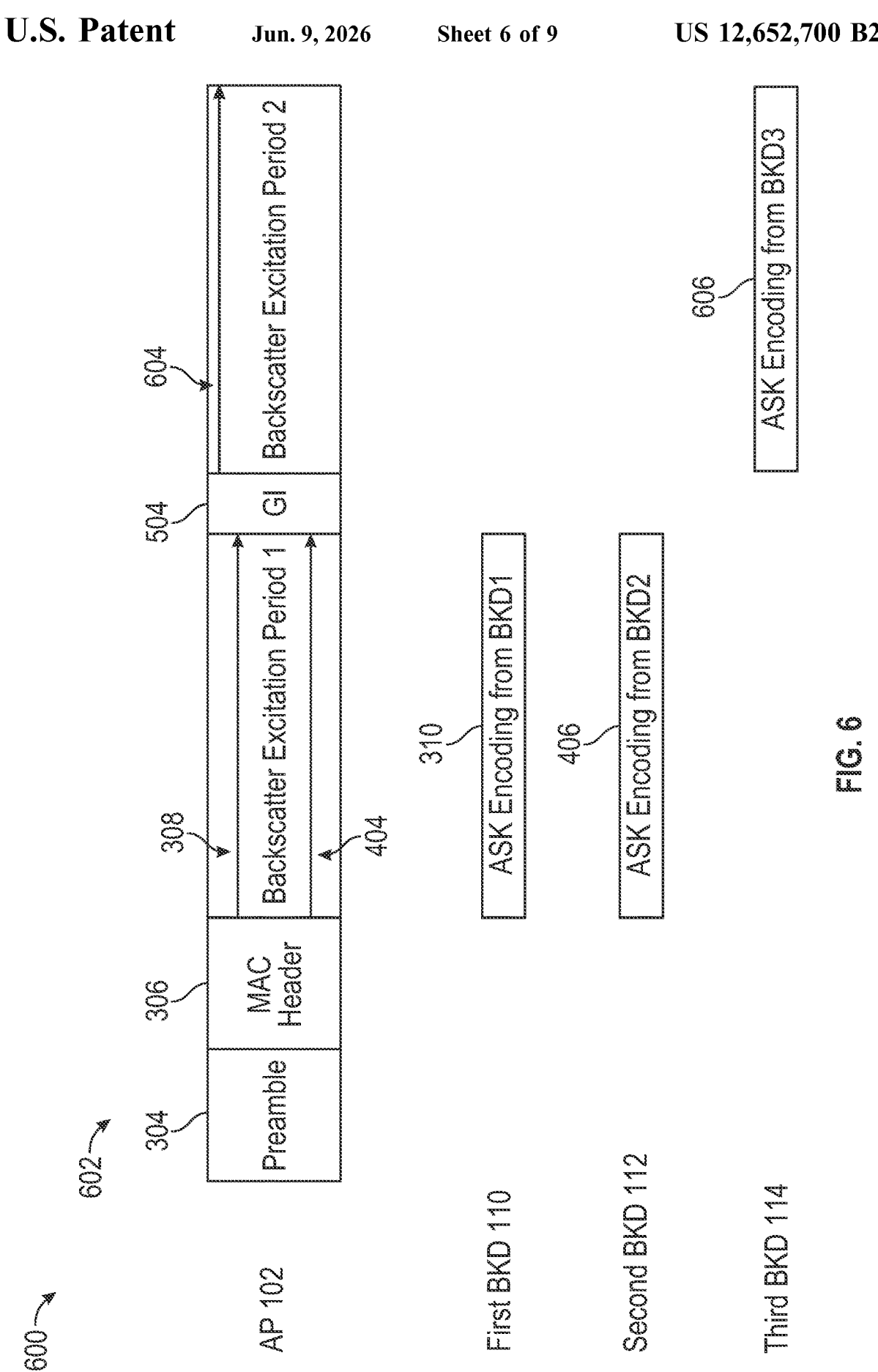
FIG. 6 is a block diagram of a fourth traffic scheduling signal process.

FIG. 6 is a block diagram of a fourth traffic scheduling signal process 600. The fourth traffic scheduling signal process 600 may be performed for staggered and concurrent backscattering. The AP 102 may perform the fourth traffic scheduling signal process 600 to enable BKDs that can concurrently backscatter without interference to perform the concurrent backscattering and enable other BKDs to perform backscattering at staggered times during a single TxOp. The fourth traffic scheduling signal process 600 may include the AP 102, the first BKD 110, the second BKD 112, and the third BKD 114.

The AP 102 may transmit a fourth excitation transmission 602, and the fourth excitation transmission 602 may include the preamble 304, the header 306, the first trigger frequency excitation signal 308, the second trigger frequency excitation signal 404, the GI 504, and a third trigger frequency excitation signal 604. The AP 102 may determine the first BKD 110 and the second BKD 112 can perform concurrent backscattering without interference. Thus, the AP 102 may transmit the first trigger frequency excitation signal 308 and the second trigger frequency excitation signal 404 concurrently, enabling the first BKD 110 to perform first BKD backscattering 310 at the same time the second BKD 112 performs second BKD backscattering 406. The third trigger frequency excitation signal 604 may have a frequency corresponding to a trigger frequency of the third BKD 114. Therefore, after the AP 102 pauses for the GI 504 to prevent interference, the AP 102 may transmit the third trigger frequency excitation signal 604, and the third BKD 114 may perform third BKD backscattering 606. Thus, the first BKD 110, the second BKD 112, and the third BKD 114 may perform backscattering during a single TxOp.

Figure 7:
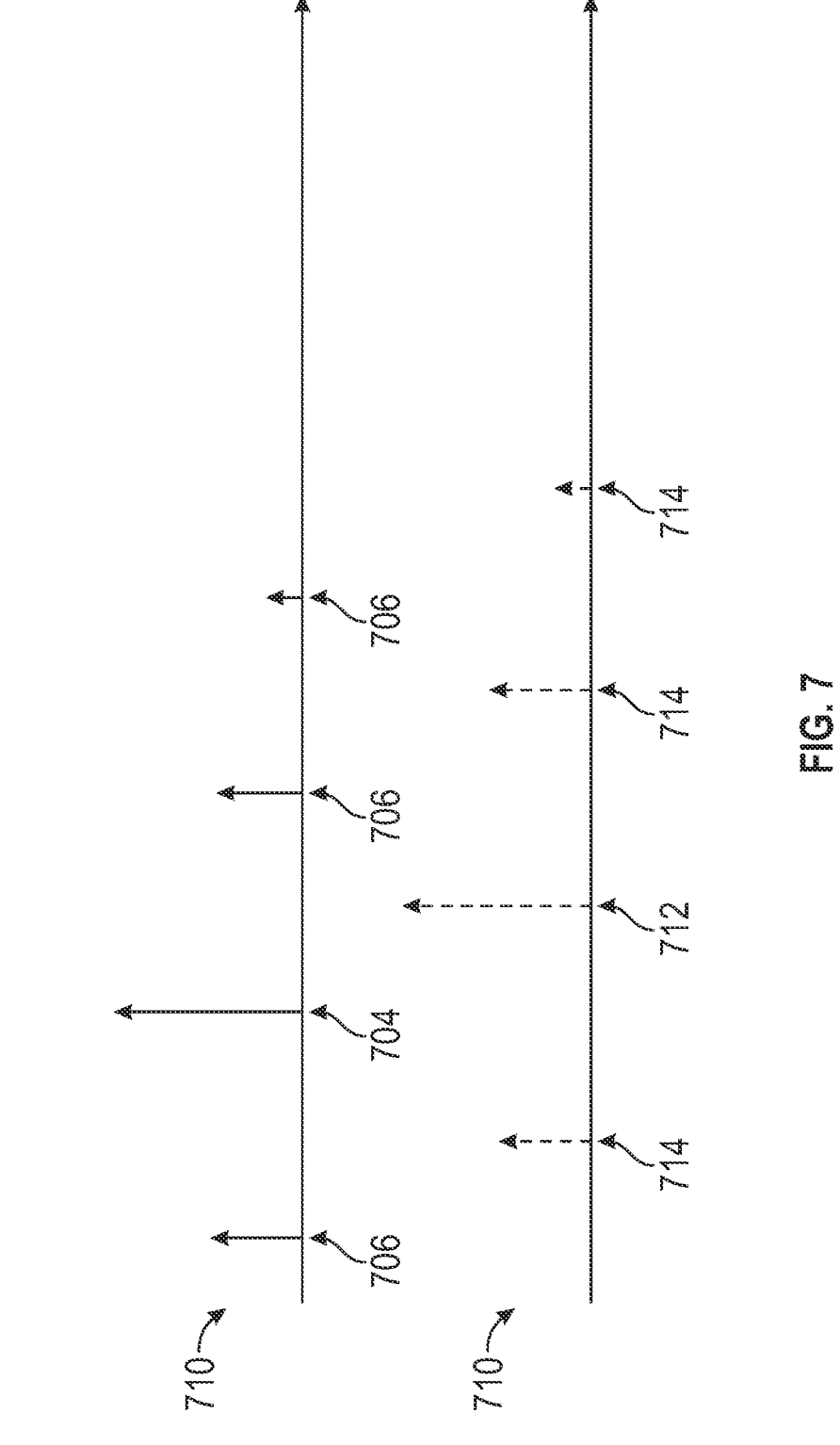
FIG. 7 is a frequency graph of a frequency combination.

FIG. 7 is a frequency graph of a frequency combination 700. The x-axis of the frequency graph may be frequency. When a BKD performs backscattering, the BKD may produce harmonics that may be decoded to determine the data the BKD encodes when performing backscattering. As described above, the AP 102 may determine combinations of trigger frequencies without overlapping harmonics resulting from backscattering to enable concurrent backscattering without interference. The AP 102 may determine the frequency combination 700 for concurrent backscattering. The frequency combination 700 may include a first trigger frequency 702 and a second trigger frequency 710. The first trigger frequency 702 may include a first trigger frequency signal 704 and first trigger frequency harmonics 706. The second trigger frequency 710 may include a second trigger frequency signal 712 and second trigger frequency harmonics 714. As illustrated by FIG. 7, the first trigger frequency signal 704, the first trigger frequency harmonics 706, the second trigger frequency signal 712, and the second trigger frequency harmonics 714 do not overlap. Thus, the AP 102 may transmit the first trigger frequency 702 and the second trigger frequency 710 for concurrent backscattering.

Figure 8:
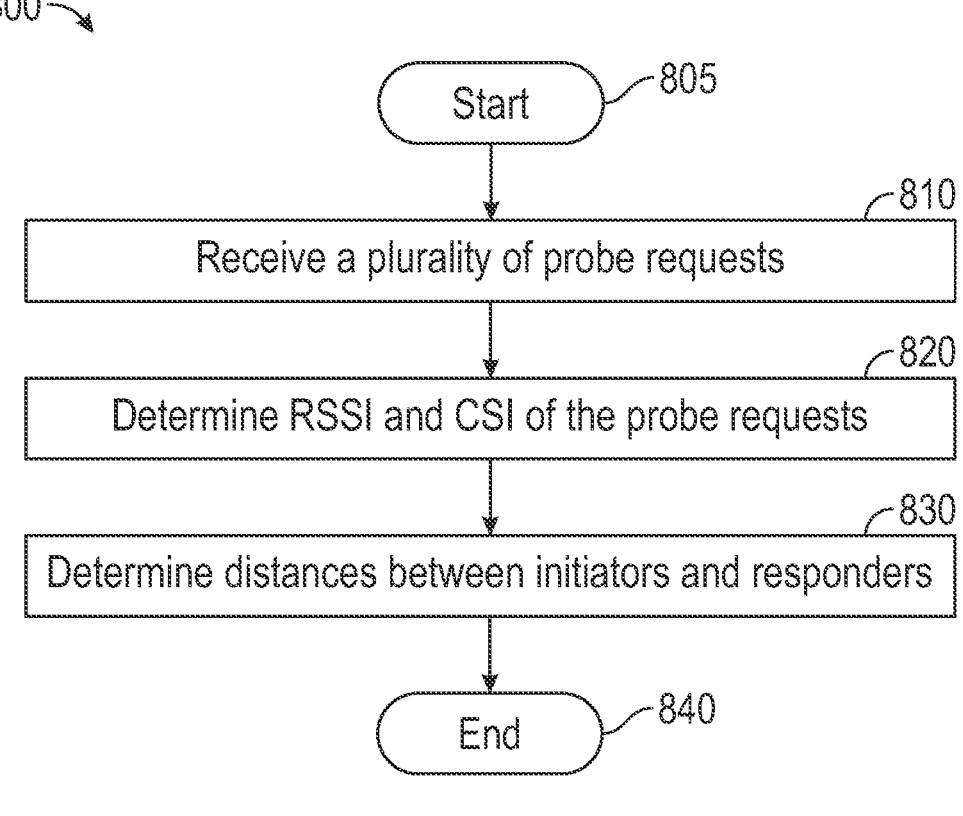
FIG. 8 is a flow chart of a method for BKD scheduling.

FIG. 8 is a flow chart of a method 800 for BKD scheduling. The method 800 may begin at starting block 805 and proceed to operation 810. In operation 810, it may be determined to transmit an excitation transmission to a plurality of Backscatter Devices (BKDs). For example, the AP 102 may determine to transmit an excitation transmission for the first BKD 110, the second BKD 112, and/or the third BKD 114 to perform backscattering.

In operation 820, a trigger frequency may be determined for each of the plurality of BKDs. For example, the AP 102 may determine the trigger frequency for the first BKD 110, the second BKD 112, and/or the third BKD 114. The AP 102 may determine the trigger frequencies by sending a cycle of transmissions with different frequencies, communicating with the BKDs, identifying pattern IDs associated with the BKDs, and/or the like.

In operation 830, an excitation transmission comprising a plurality of excitation signals may be transmitted. For example, the AP 102 may transmit an excitation transmission, such as the first excitation transmission 302, the second excitation transmission 402, the third excitation transmission 502, or the fourth excitation transmission 602. Each excitation signal may have a frequency corresponding to one of the trigger frequencies for the plurality of BKDs. The plurality of excitation signals may be ordered for the plurality of BKDs to perform backscattering (i) concurrently; (ii) staggered in a single Transmit Opportunity (TxOp); or (iii) a combination of (i) and (ii). The method 800 may conclude at ending block 840.

Figure 9:
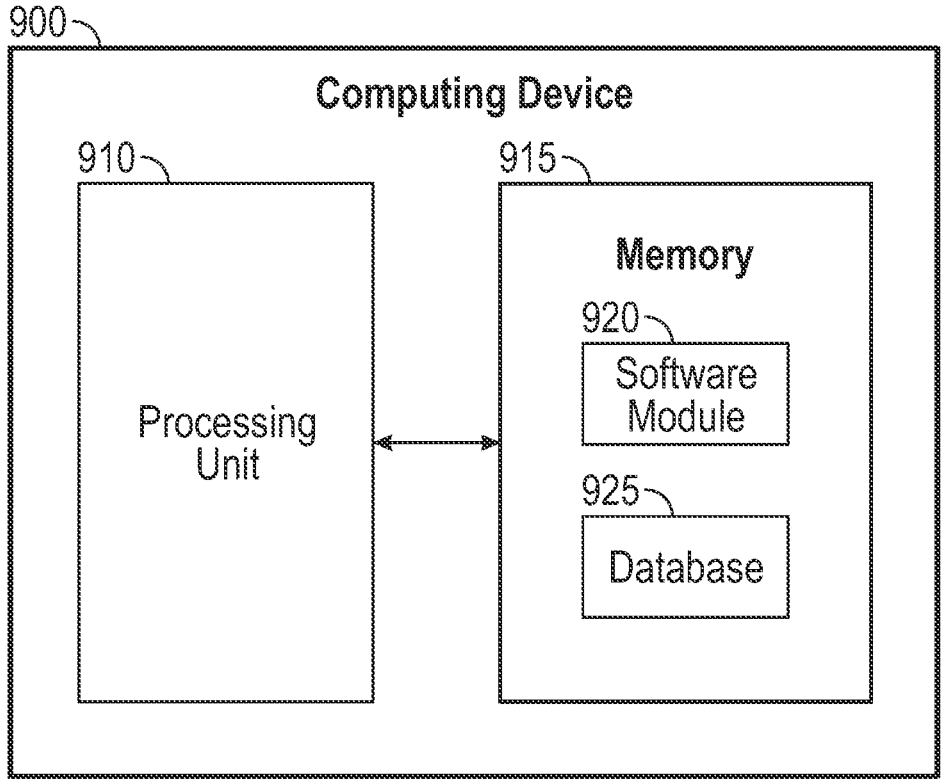
FIG. 9 is a block diagram of a computing device.

FIG. 9 is a block diagram of a computing device 900. As shown in FIG. 9, computing device 900 may include a processing unit 910 and a memory unit 915. Memory unit 915 may include a software module 920 and a database 925. While executing on processing unit 910, software module 920 may perform, for example, processes for BKD scheduling and, specifically, narrowband BKD excitation for multiple BKD scheduling with respect to FIG. 1, FIG. 2, FIG. 3, FIG. 4, FIG. 5, FIG. 6, FIG. 7, and FIG. 8. Computing device 900, for example, may provide an operating environment for the AP 102, the first BKD 110, the second BKD 112, the third BKD 114, the BKD 200, and the like. The AP 102, the first BKD 110, the second BKD 112, the third BKD 114, the BKD 200, and the like may operate in other environments and are not limited to computing device 900.

Computing device 900 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 900 may comprise any computer operating environment, such as hand-held devices, multiprocessor systems, microprocessor-based or programmable sender electronic devices, minicomputers, mainframe computers, and the like. Computing device 900 may also be practiced in distributed computing environments where tasks are performed by remote processing devices. The aforementioned systems and devices are examples, and computing device 900 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general-purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 900 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A method comprising:
    determining to transmit an excitation transmission to a plurality of Backscatter Devices (BKDs);
    determining a trigger frequency for each of the plurality of BKDs, wherein determining the trigger frequency for each of the plurality of BKDs comprises:
    sending a cycle of transmissions with different frequencies,
    receiving, from the plurality of BKDs, a different frequency harmonics resulting from backscattering of the different frequencies by different BKDs, and
    determining combinations of the trigger frequency for each of the plurality of BKDs without overlapping trigger frequency harmonics resulting from backscattering from the plurality of BKDs; and
    transmitting the excitation transmission comprising a plurality of excitation signals, wherein:
    each excitation signal has a frequency corresponding to one of the trigger frequencies for the plurality of BKDs, and
    the plurality of excitation signals are ordered for the plurality of BKDs to perform backscattering (i) concurrently; (ii) staggered in a single Transmit Opportunity (TxOp);
    or (iii) a combination of (i) and (ii).

2. The method of claim 1, further comprising:
sending a cycle of transmission signals with different trigger frequencies to identify the plurality of BKDs.

3. The method of claim 1, further comprising:
determining a first trigger frequency and a second trigger frequency that will not have overlapping harmonics resulting from backscattering, wherein:
    the first trigger frequency and the second trigger frequency are the trigger frequencies for the plurality of BKDs, and
    the plurality of BKDs comprise a first BKD with the first trigger frequency and a second BKD with the second trigger frequency.

4. The method of claim 1, wherein:
the plurality of BKDs have any one of (i) a static trigger frequency, (ii) a modifiable trigger frequency, or (iii) a dynamic trigger frequency.

5. The method of claim 1, wherein the plurality of BKDs comprise:
    one or more filters associated with the trigger frequency of the associated BKD;
    one or more power detectors operable to detect when the one or more filters filter the plurality of excitation signals;
    a Radio Frequency (RF) power comparator operable to determine the frequencies of the plurality of excitation signals based on the power detectors detecting when the one or more filters filter the plurality of excitation signals; and a backscatter logic operable to perform backscattering when the plurality of BKDs receive one of the excitation signals with the frequency corresponding to a trigger frequency.

6. The method of claim 1, wherein the plurality of BKDs have a general trigger frequency wherein all of the BKDs will perform backscattering when the frequency of one of the excitation signals corresponds to the general trigger frequency.

7. The method of claim 1, wherein backscattering comprises Amplitude-Shift Keying (ASK).

8. A system comprising:

a memory storage; and a processing unit coupled to the memory storage, wherein the processing unit is operative to:

determine to transmit an excitation transmission to a plurality of Backscatter Devices (BKDs);

determine a trigger frequency for each of the plurality of BKDs, wherein the processing unit being operative to determine the trigger frequency for each of the plurality of BKDs comprises the processing unit being operative to:

sending a cycle of transmissions with different frequencies, receiving, from the plurality of BKDs, different frequency harmonics resulting from backscattering of the different frequencies by different BKDs, and determining combinations of the trigger frequency for each of the plurality of BKDs without overlapping trigger frequency harmonics resulting from backscattering from the plurality of BKDs; and transmit the excitation transmission comprising a plurality of excitation signals, wherein:

each excitation signal has a frequency corresponding to one of the trigger frequencies for the plurality of BKDs, and the plurality of excitation signals are ordered for the plurality of BKDs to perform backscattering (i) concurrently; (ii) staggered in a single Transmit Opportunity (TxOp); or (iii) a combination of (i) and (ii).

9. The system of claim 8, the processing unit being further operative to:

send a cycle of transmission signals with different trigger frequencies to identify the plurality of BKDs.

10. The system of claim 8, the processing unit being further operative to:

determine a first trigger frequency and a second trigger frequency that will not have overlapping harmonics resulting from backscattering, wherein:

the first trigger frequency and the second trigger frequency are the trigger frequencies for the plurality of BKDs, and the plurality of BKDs comprise a first BKD with the first trigger frequency and a second BKD with the second trigger frequency.

11. The system of claim 8, wherein:

the plurality of BKDs have any one of (i) a static trigger frequency, (ii) a modifiable trigger frequency, or (iii) a dynamic trigger frequency.

12. The system of claim 8, wherein the plurality of BKDs comprise:

one or more filters associated with the trigger frequency of the associated BKD;

one or more power detectors operable to detect when the one or more filters filter the plurality of excitation signals;

a Radio Frequency (RF) power comparator operable to determine the frequencies of the plurality of excitation signals based on the power detectors detecting when the one or more filters filter the plurality of excitation signals; and a backscatter logic operable to perform backscattering when the plurality of BKDs receive one of the excitation signals with the frequency corresponding to a trigger frequency.

13. The system of claim 8, wherein the plurality of BKDs have a general trigger frequency wherein all of the BKDs will perform backscattering when the frequency of one of the excitation signals corresponds to the general trigger frequency.

14. The system of claim 8, wherein backscattering comprises Amplitude-Shift Keying (ASK).

15. A non-transitory computer-readable medium that stores a set of instructions which when executed perform a method executed by the set of instructions comprising:

determining to transmit an excitation transmission to a plurality of Backscatter Devices (BKDs);

determining a trigger frequency for each of the plurality of BKDs, wherein determining the trigger frequency for each of the plurality of BKDs comprises:

sending a cycle of transmissions with different frequencies, receiving, from the plurality of BKDs, different frequency harmonics resulting from backscattering of the different frequencies by different BKDs, and determining combinations of the trigger frequency for each of the plurality of BKDs without overlapping trigger frequency harmonics resulting from backscattering from the plurality of BKDs; and transmitting the excitation transmission comprising a plurality of excitation signals, wherein:

each excitation signal has a frequency corresponding to one of the trigger frequencies for the plurality of BKDs, and the plurality of excitation signals are ordered for the plurality of BKDs to perform backscattering (i) concurrently; (ii) staggered in a single Transmit Opportunity (TxOp);

or (iii) a combination of (i) and (ii).

16. The non-transitory computer-readable medium of claim 15, the method executed by the set of instructions further comprising:

sending a cycle of transmission signals with different trigger frequencies to identify the plurality of BKDs.

17. The non-transitory computer-readable medium of claim 15, the method executed by the set of instructions further comprising:

determining a first trigger frequency and a second trigger frequency that will not have overlapping harmonics resulting from backscattering, wherein:

the first trigger frequency and the second trigger frequency are the trigger frequencies for the plurality of BKDs, and the plurality of BKDs comprise a first BKD with the first trigger frequency and a second BKD with the second trigger frequency.

18. The non-transitory computer-readable medium of claim 15, wherein:

the plurality of BKDs have any one of (i) a static trigger frequency, (ii) a modifiable trigger frequency, or (iii) a dynamic trigger frequency.

19. The non-transitory computer-readable medium of claim 15, wherein the plurality of BKDs comprise:

one or more filters associated with the trigger frequency of the associated BKD;

one or more power detectors operable to detect when the one or more filters filter the plurality of excitation signals;

a Radio Frequency (RF) power comparator operable to determine the frequencies of the plurality of excitation signals based on the power detectors detecting when the one or more filters filter the plurality of excitation signals; and a backscatter logic operable to perform backscattering when the plurality of BKDs receive one of the excitation signals with the frequency corresponding to a trigger frequency.

20. The non-transitory computer-readable medium of claim 15, wherein the plurality of BKDs have a general trigger frequency wherein all of the BKDs will perform backscattering when the frequency of one of the excitation signals corresponds to the general trigger frequency.

\* \* \* \* \*